United States Patent [19]

Adams

[11] Patent Number: 5,023,317

[45] **Date of Patent: * Jun. 11, 1991**

[54] PROCESS FOR DESTRUCTION OF TOXIC ORGANIC CHEMICALS AND THE RESULTANT INERT POLYMER BY-PRODUCT

[75] Inventor: Harold W. Adams, Monroe, Conn.

[73] Assignee: Sultech, Inc., Wilmington, Del.

[ * ] Notice: The portion of the term of this patent subsequent to Apr. 8, 2003 has been disclaimed.

[21] Appl. No.: 496,654

[22] Filed: Mar. 21, 1990

Related U.S. Application Data

[63] Continuation of Ser. No. 846,916, Apr. 1, 1986, Pat. No. 4,921,936, which is a continuation-in-part of Ser. No. 644,545, Aug. 27, 1984, Pat. No. 4,581,442.

[51] Int. Cl.[5] ........................ C08J 11/00; C08J 11/02; C08J 11/04

[52] U.S. Cl. ........................ 528/389; 521/40; 521/46; 528/481; 570/204; 570/211

[58] Field of Search .................. 528/389, 481; 521/40, 521/40.5, 46; 570/204, 211

[56] References Cited

U.S. PATENT DOCUMENTS

| | | | |
|---|---|---|---|
| 3,491,046 | 1/1970 | Patchuta | 524/905 |
| 3,793,235 | 3/1974 | Goebel, Jr. | 571/16 |
| 3,884,884 | 5/1975 | Scogginset et al. | 528/389 |
| 3,919,177 | 11/1975 | Campbell | 528/389 |
| 4,581,442 | 4/1986 | Adams | 528/389 |

FOREIGN PATENT DOCUMENTS

| | | |
|---|---|---|
| 49-127594 | 12/1974 | Japan . |
| 57-29393 | 2/1982 | Japan . |

OTHER PUBLICATIONS

Chemical Abstracts, vol. 85, No. 11, Sep. 13, 1976, p. 515, Ref. 77762n, U.S.S. HAE.

"Reaction Between Diphenylsulphone and Elemental Sulfur and Detoxification of Polychlorinated Biphenyls", Gendai Kaguka, 1974.

*Primary Examiner*—Allan M. Lieberman

*Attorney, Agent, or Firm*—Dickstein, Shapiro & Morin

[57] ABSTRACT

The invention is a chemical process for complete destruction and safe disposition of hazardous organic chemicals carbonaceous chemicals. The invention also comprises the process for production of an inert polymer formed essentially of Carbon and Sulfur, and also comprises the new inert polymer, itself and articles made of the new polymer. This new polymer has many of the properties of refractory materials and is an inert non-inflammable cross-linked polymer that is relatively insoluble in all generally known solvents. In the process of the invention, a carbonaceous chemical and Sulfur is heated, in an atmosphere of Nitrogen at 500° to 1500° C. Waste gases including sulfur and sulfides are condensed, scrubbed and the sulfur recycled. The solids residue when analyzed by a mass spectrometer contains less than one (1) part per million (1 ppm) of unreacted organic chemical.

36 Claims, 1 Drawing Sheet

PROCESS FOR DESTRUCTION OF TOXIC ORGANIC CHEMICALS AND THE RESULTANT INERT POLYMER BY-PRODUCT

This application is a continuation of application Ser. No. 846,916, filed Apr. 1, 1986, now U.S. Pat. No. 4,921,936 which is a Continuation-in-part of Ser. No. 644,545 filed Aug. 27, 1984, now U.S. Pat. No. 4,581,442 issued Apr. 8, 1986.

FIELD OF THE INVENTION

This invention relates generally to a process for the safe destruction of toxic and hazardous organic chemicals and for the conversion of such chemicals to a safe inert and useful non-toxic polymer by-product.

BACKGROUND OF THE INVENTION

A long felt want in the chemical industry has been a safe and reliable process of conversion of toxic organic chemicals to inert useful material which will itself have economic value.

Many toxic chemicals which it is desired destroy are contaminated with other chemicals or are mixtures of various compounds of organic chemicals or organic and inorganic chemicals. A commercial process for destruction of toxic chemicals therefor must be capable of destroying varying mixtures of input chemicals and converting the input mixtures into inert end products that preferably have commercial use.

The prior art processes and chemicals produced by such processes are usually acceptable for their intended purposes. These processes and products have not proven to be satisfactory for the task of reliably converting 100% of a toxic organic chemical such as polychlorinated Biphenyl (PCB), contaminated or used motor lubricating oils, or contaminated organic solvents such as alcohols, ketones, aldehydes, into end products with little or no residue of the original input chemicals and or an end product of a completely inert character. As a result of the shortcomings of the prior art, typified by the above, there has developed and continues to exist a substantial need for the process of the character described. Despite this need, and the efforts of many individuals and companies to develop such processes, a satisfactory process meeting this need has heretofore been unavailable.

The principal object of this invention is to provide a process and a product produced by such process which combines simplicity, and reliability together with inexpensiveness of operation and economies resulting from the sale of a useful inert by-product and other commercial by-products.

Other objects of this invention will in part be obvious and in part hereinafter be pointed out.

SUMMARY OF THE INVENTION

The invention is a chemical process for complete destruction and safe disposition of hazardous organic chemicals and halogen-polymers such as PCB. The invention is a process that is commercially satisfactory for the task of reliably converting a chemical containing carbon such as graphite, powdered carbon, or an organic chemical such as polychlorinated Biphenyl (PCB), contaminated or used motor lubricating oils, or organic solvents such as alcohols, ketones, aldehydes, into sulfides and into an inert end product with little or no residue of the original input chemicals. The invention also lies in the novel inert polymer or polymer-like material comprised substantially of carbon and sulfur produced as an end-product of my chemical process.

The process of the invention combines sulfur, preferably in the vapor state, with carbon to form an inert polymer or polymer-like material comprised substantially of carbon and sulfur. The reaction of my process removes carbon from the molecule of a carbonaceous or organic chemical compound to result in the safe destruction of the former organic compound. Organic chemicals which are transformed by this reaction into the end-products of an inert carbon-sulfur material include, but are not limited to, aliphatic hydrocarbon compounds, carbocyclic compounds such as alicyclic compounds and aromatic organic compounds, organometallic compounds, natural and synthetic carbon-containing polymers, organic sulfur compounds, aliphatic flourides, as well as amino acids, alkaloids, porphyrins, chlorophyll, cyanins, steroids, carbohydrates, and including ethers, alcohols, esters, ketones, aldehydes, alkanes, and alkenes. The term "organic chemical" as employed in this application has the conventional chemical definition of a carbonaceous chemical whether formed synthetically or produced by living organisms.

The novel inert end product of my process appears to be an inert polymer which is formed of relatively similar parts of Carbon and Sulfur, by weight. The new Carbon-Sulfur polymer has many of the properties of refractory materials and is an inert non-inflammable cross-linked chemical that is insoluble in organic solvents as well as inorganic acids and bases. It should be noted that the ratio of sulfur to carbon by weight in the end-product may vary based on the ratio of these elements in the inputs and based on sulfur or other material which may have condensed and become entrapped in the end product. Such entrapped condensed sulfur may be removed from the end product, if it occurs, by heating of the end product to temperatures above five hundred degrees Celsius for a period of time.

Sulfur is known to cross-link with itself as well as with carbon so that the end-product may contain non-uniform proportions of carbon and sulfur. However the resulting inert carbon sulfur end product which I call CSP (Carbon/Sulfur Polymer) is predominantly a chemical compound comprised substantially of Carbon and Sulfur by weight with some small amounts by weight of other elements such as Hydrogen. The CSP may also include metal elements, if they were present in the original input chemical, with said metal elements bound in insoluble manner to the CSP molecules, and with said metal elements rendered inert by being locked into the CSP molecules.

Any organic chemical, such as polychlorinated Biphenyl (PCB), contaminated or used motor lubricating oils, or contaminated organic solvents such as alcohols, ketones, aldehydes, or hydrocarbon, or aromatic hydrocarbon may be safely destroyed and converted into the inert end product and into sulfides of the various elements of which the organic chemical was comprised. The term "organic chemical" used by the applicant herein includes any of the above chemicals, and indeed, any chemical compound formed of molecules in which a carbon atom is bonded to other atoms, such other atoms including any one or more atoms such as carbon, hydrogen, oxygen, chlorine, flourine, bromine or nitrogen. Included in this category of chemicals, are the carbonyl chemicals which are organic chemicals containing the radical Carbon-Oxygen and including molecules in which a metal atom is bonded to a molecule containing carbon.

In my process, the highly reactive affinity of sulfur to other elements and to carbon, at high temperatures, results in the chemical bonding of sulfur directly to the carbon atoms of any carbon-containing molecule with the replacement of sulfur for whatever other elements that had been formerly bonded to the carbon atoms of said molecule. Each of these other elements that are released from the carbon-containing molecule become individually bonded to sulfur in the absence of oxygen, forming conventional inorganic sulfides, sulfites etc. However the chemical bonding of sulfur to carbon, in my process, results in the formation of a new carbon-sulfur material with unusual inert chemical properties and with other desirable commercial properties.

The chemical process of my invention serves to strip the carbon atoms out of all carbon-containing chemical compounds in the category of "organic chemicals". The process strips the carbon atoms out of such chemical carbonaceous compounds by subjecting the aforesaid carbonaceous chemical compound to vaporized sulfur, in a reaction chamber under an oxygen-free atmosphere at 500° to 1500° C. with the consequence that said vaporized sulfur combines directly with carbon atoms of the organic chemical to form solid particles of the inert polymer of my invention.

The carbon atoms that are removed from the input organic chemical compound combine with the sulfur to form a novel solid end-product compound which has the properties of an inert polymer and may be comprised primarily of sulfur and carbon by weight, with said end-product being insoluble in known solvents such as aqua regia and carbon disulfide. The vaporized sulfur in the reaction chamber also combines with the other elements of the input organic compound to form vapor sulfides of hydrogen, oxygen, halogen, if these are the elements that were combined or contained in the input organic compound by the substitution of sulfur and the bonding of sulfur to the carbon atoms. These sulfides can be recovered using conventional chemical processes in the form of sulfide salts or as other sulfur compounds and may be further processed, as desired, to increase the commercial value to the by-products of my process.

All waste gases containing sulfides may be condensed, scrubbed and if sulfur is recovered, the sulfur may be recycled. Residue sulfide gases and nitrogen gas may be recycled back into the reactor to eliminate venting of any gases from the system. Residues of the solid sulfur-carbon end product, when analyzed by a mass spectrometer, have been found to contain less than one (1) part per million (1ppm) of the unreacted said starting organic chemical.

While the process of the invention is described in terms of destruction of hazardous PCB, this same process is equally effective for converting into the inert carbon/sulfur compound of my invention any other mixtures of hydrocarbons or hydrocarbon polymers or any organic chemical such as a ketone, aldehyde, alcohol, straight carbon chain compound, ring carbon compound, aliphatic compound, alkyd compound, carbonyl compound. My process is highly suitable for the safe destruction of used motor lubricating oil. By comparison, the incineration of such lubricating oils in conventional fashion may result in venting of harmful fumes into the atmosphere. My process is also highly suitable for safe destruction of inert halogen compounds or other organic chemicals, including inert organic propellant compounds that have become contaminated with toxic chemicals which which they have been in contact.

DESCRIPTION OF THE BEST MODE OF THE INVENTION

Figure 1:
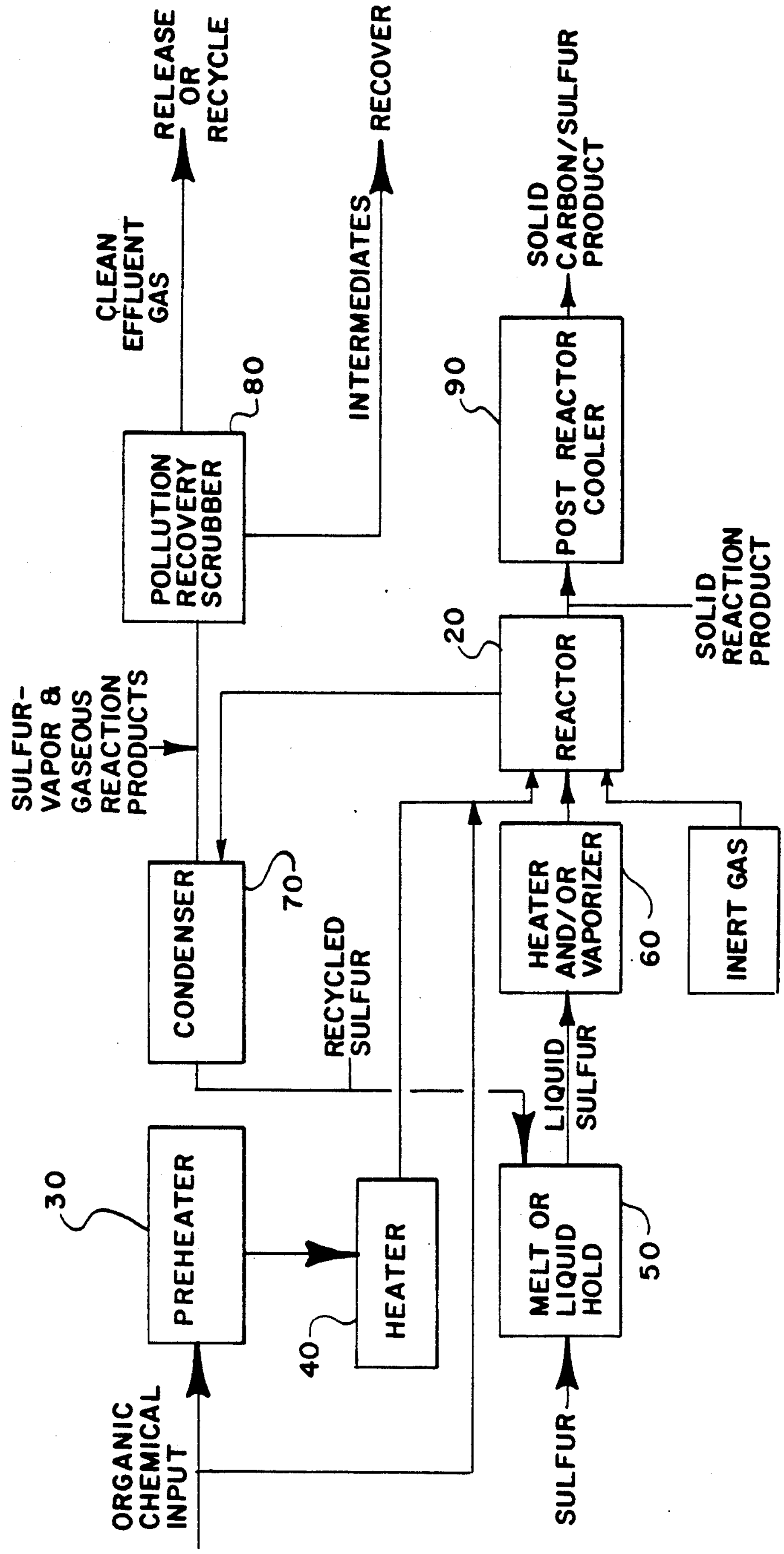
FIG. 1 is a block diagram of the process of the invention.

Turning now descriptively to the drawing, in which similar reference characters denote similar elements through out the view, FIG. 1 illustrates the process of the invention.

The chemical waste material to be destroyed, an organic chemical as described above, or an organic chemical which is a halogen compound such as PCB, or indeed any carbonaceous chemical, is added directly into reactor 20 or first heated in preheater 30 and heater 40 before being fed into the reactor 20. Fresh or recycled sulfur is fed into heated melt tank 50 in which it held in the melted condition and then fed into high temperature heater and or vaporizer tank 60 to be then fed into reactor 20. An inert gas such as nitrogen is also fed into the reactor 20 to maintain an inert oxygen-free atmosphere. Pressurized nitrogen gas may also be introduced into preheater 30, heater 40, melt tank 50 and high temperature tank 60 and employed to provide a pumping action to drive the waste liquid input and the sulfur into the reactor 20. It is preferable to furnish an excess of sulfur into the reaction chamber. A ratio of 3:1 by weight of sulfur to input carbonaceous chemical has proven highly satisfactory.

Reactor 20 is preferably a rotating screw type oven and heated preferably by electric induction heating coils to maintain a temperature in the range of 500 degrees C. to 1500 degrees C. inside of the reactor. The preferred reactor temperature is close to the 500° C. range above the vaporization temperature of sulfur. Within a matter of minutes at this temperature, and in less than 5 minutes, the organic chemical and sulfur or PCB and sulfur have completely reacted together to produce a black solid material that contains less than 1 part per million of unreacted organic material or PCB.

Further heating in the reactor, at the temperature range of 500 to 1500 degrees Celsius produces a black solid polymer product, the analysis of which, by weight, is as follows:

Carbon: 49.01%
Hydrogen: 0.67%
Sulfur: 48.79%
Unreacted PCB: $<$1 ppm by mass spectrometer The black solid polymer compound of substantially equal weights of Sulfur and Carbon, I call carbon/sulfur polymer or CSP. Although the exact molecular structure in terms of molar ratios of Sulfur to Carbon has not been established cf CSP,the following properties have been demonstrated by actual tests:

When ground to a powder, it resembles appearance of carbon black
No observable melting point
Complete absorber of Ultra Violet and Infra-red light spectra
Not soluble in any known solvent
Not affected by Aqua Regia
An excellent electrical conductor These properties suit the following useful applications:

Filler for non-corrosive coatings
Filler for solar energy absorber devices
Filler in body implants to resist physical changes caused by human biological effects
Electronic resistor and conductive applications
Filler for cements and asphalt I have found similar properties in the end product CSP of my process, when the starting chemical compound is a non-halogen organic chemical such as motor lubricating oil and other mineral oil.

In particular, the combination of electrical conductive properties, and absorption of infra-red light (radiant heat energy) and inert chemical characteristics are particularly suited for solar energy conversion devices including devices for producing photo-galvanic and thermoelectric conversion.

Uses of the sulfur and carbon composition which is a product of the invention include its utilization as an absorber of heat radiation, its utilization as an absorber of other radiant energy, its utilization as a refractory material, as well as its utilization as an inert filler material, and its employment as a refractory material and as a filler in asphalt.

A most valuable use for the end product CSP is as a filler in a paint, varnish or other coating liquid for the purpose of applying an anti-spy coating on an object such as a military tank. The CSP material in the coating will absorb, without reflection, infra-red rays sent from an infra-red projector/detector unit to prevent the detector unit from sensing the said coated object. In this manner, the CSP material, coated on a military object renders the vehicle invisible to users of infra-red spy devices that depend upon reflection of infra-red rays.

A variant of my process may be employed to mold CSP into specific shapes using suitably modified thermosetting and/or transfer molding equipment. A quantity of carbon powder and sulfur powder is together mixed may be inserted at an elevated temperature above the melting point of sulfur into the cavity of a mold, under an inert atmosphere, and under pressures which compact the mixed carbon and sulfur together. The pressure is maintained until the carbon and sulfur have chemically combined to form a molded shape of CSP. The molded shape of CSP has extremely high temperature resistance as compared to other thermosetting plastic material. Heating of the molded shape above 450° C. or preferably above 500° C. in an inert atmosphere such as nitrogen will vaporize any excess unreacted sulfur from the molding so that the initial mixture may contain an excess of sulfur to carbon by weight.

From the standpoint of ecomomy, the chemical reaction in reactor 20 combines both exothermic and endothermic reactions at the temperatures above 500 degrees C., and therefor the process supplies much of the necessary energy. Furthermore the current nation-wide ecological emphasis on the use of coal-fired plants and coal gasification results in production of increased quantities of waste Sulfur derived from coal which may serve as a source of supply to feed my process. Thus my invention may be considered to use up two waste products, PCB or other hazardous organic material and sulfur, to produce a new inert product of economic potential.

The reaction, on balance, may be endothermic and require external heat input to stablize the operating temperature. Where the nature of the input organic chemical dictates, the reaction may be exothermic on balance.

As shown in FIG. 1, the vapor products consisting of sulfur vapor, and hydrogen sulfide, carbon di-sulfide, sulfur-chloride gases are fed into a sulfur condenser 70 which recycles condensed sulfur back to the melt tank 50. The remaining gases are then fed into conventional pollution recovery scrubber equipment 80, producing clean effluent gas that may be passed into the atmosphere and conventional chemical intermediates. The solid reaction product of carbon/sulfur polymer, CSP, is fed into post reactor cooler unit 90, and may be then transferred to appropriate grinding and mixing equipment as desired for further use of the product, or for further cycling of the CSP into a second or third stage reactor for further reduction of residue content.

Other by-products of my process include gases of hydrogen sulfide ($H_2S$), carbon disulfide ($CS_2$) and sulfur chlorides ($S_xCl_2$) which may be recovered and removed from the effluent by conventional methods. Sulfur vapors are also recovered and condensed and recycled through the process. The organic chemical to be disposed of is normally fed into the reactor at any temperature ranging from ambient to 650 degrees Celsius preferably through a nozzle or distributing spray although in some cases the feed temperature may range to 1100 degrees C. The sulfur is fed into the reactor as a melted liquid at a temperature ranging from about 135 degrees C. to about 450 degrees C. or fed into the reactor as a vapor at temperatures ranging from about 450 degrees C. to 1500 degrees C. through a nozzle or spray nozzle. Pressure of the inert nitrogen gas in the reactor is preferably maintained between 1 and 2 atmospheres.

Estimates of the efficiency and costs of my process indicate that a plant can be constructed at a cost of $26,000,000.00 of a capacity to safely dispose of 24 tons per day of a PCB organic such as Westinghouse Company transformer oil "Inerteen 70-30" (ASTM specification D-2283 Type D). The operating costs of such a plant, not including interest and amortization nor credit for sale of by-product, would approximate $.72 per pound of PCB destroyed.

Including interest and amortization, the total costs per pound of PCB destroyed are estimated at $1.50 per pound, on the basis of a three year payout of investment.

The process and product of my invention may be employed to produce films and coatings of the inert Carbon/sulfur polymer or polymer-like end product CSP upon metal, glass, ceramic and other materials. Such coatings may be of a decorative nature, or they may be employed to take advantage of the unique properties of CSP such as infra-red absorption, electrical conductivity, high temperature resistance individually or together. In forming such coatings, the CSP material may be ground to particulate size and employed as the filler of a coating solvent, paint or varnish.

An alternative method of binding a coating of CSP onto a high-temperature resistant substrate employs the following steps:

a) After cleaning, the surface of a substrate unit is coated with a liquid organic compound such as a mineral oil or an organic polymer compound and then heated so as to dry the coating on the substrate unit.
b) The substrate unit is heated under an oxygen-free atmosphere to a temperature above the vaporization temperature of sulfur in a reactor chamber into which sulfur vapor is charged.

c) The carbon molecules of the coating on the substrate surface react with the sulfur vapor to form a coating of CSP which bonds to the surface of the substrate unit.

d) The substrate unit may be transferred to an annealing chamber maintained under an inert atmosphere and or maintained at reduced pressure below 1 atmosphere so that any sulfur gases or sulfide gases formed in the reaction are driven off, prior to cooling of the substrate unit.

Since CSP has electrically conductive properties, the coating process above may be employed to produce electrical conducting printed circuits of a particular design, where the substrate is initially selectively coated, by screen or print methods, with an organic compound to form a coating of an organic material in the outlined form of the desired conductors of the printed circuit. After reacting with sulfur vapor, the printed circuit design is in the form of lines of electrical conductors of CSP.

The thickness of the coating or of the coated lines of CSP on the substrate may be regulated by originally employing liquid organic coating compounds of varying viscosity in initially coating the substrate material.

The resulting coating of CSP material is strongly adherent to the surface of the substrate. Coatings of CSP of thickness of the order of one or several molecules may also be formed if the object is initially coated by immersion in a container of water upon the surface of which a monomolecular layer of oil is floated. As the object is brought up through the surface layer of oil, an extremely thin layer will form on the surface of the object, assuring that the final transformation of this coating of oil by combination with sulfur vapor will result in a CSP coating of minimum thickness.

It is thought that persons skilled in the art to which this invention relates will be able to obtain a clear understanding of the invention after considering the foregoing description in connection with the accompanying drawing. Therefor, a more lengthy description is deemed unnecessary. It is understood that various changes in shape, size, and arrangement of the elements of this invention as claimed may be resorted to in actual practice, if desired. While the process has been described in terms of conversion of Polychlorinated Biphenyl from a hazardous chemical to a useful inert material, tests conducted under the direction of the applicant have demonstrated that the process of the invention is equally effective for conversion, of other organic chemicals and polymers to an inert insoluble material, including conversion of other straight chain and aromatic organic chemicals and polymers by their reaction with sulfur vapor at temperatures in the indicated range of 500° C. to 1500° C. under oxygen-free conditions.

I claim as my invention:

1. A chemically inert, solid composition of matter composed substantially of sulfur and carbon produced by the process comprising the following steps:

a) Reacting sulfur vapor and a carbonaceous chemical together in a reactor under a substantially oxygen-free atmosphere at a temperature above the vaporization temperature of sulfur in the range of 500 degrees C. to 1500 degrees C. and at a pressure of about one to two atmospheres, so as to form a chemically inert, solid composition of matter composed substantially of sulfur and carbon, which resulting solid composition has little or no remaining residues of said carbonaceous chemical, and b) Separating the resulting formed solid composition from any vapor phases in the reactor.

2. The composition of claim 1 wherein said carbonaceous chemical is an organic chemical.

3. The composition of claim 2 wherein said organic chemical is a hydrocarbon compound.

4. The composition of claim 2 wherein said organic chemical is an aliphatic compound.

5. The composition of claim 2 wherein said organic chemical is a carbocyclic compound.

6. The composition of claim 5 wherein said carbocyclic compound is an aromatic compound.

7. The composition of claim 5 wherein said carbocyclic compound is an alicyclic compound.

8. The composition of claim 1 wherein an excess of sulfur to said carbonaceous chemical, by weight, is supplied into said reactor.

9. A chemically inert, solid composition of matter composed substantially of sulfur and carbon produced by the process comprising the following steps:

a) Reacting sulfur vapor and a nonhalogenated carbonaceous chemical together in a reactor under a substantially oxygenfree atmosphere at a temperature above the vaporization temperature of sulfur in the range of 500 degrees C. to 1500 degrees C., so as to form a chemically inert, solid composition of matter composed substantially of sulfur and carbon, which resulting solid composition has little or no remaining residues of said nonhalogenated carbonaceous chemical, and b) Separating the resulting formed solid composition from any vapor phases in the reactor.

10. The composition of claim 9 wherein said carbonaceous chemical is an organic chemical.

11. The composition of claim 10 wherein said organic chemical is a hydrocarbon compound.

12. The composition of claim 10 wherein said organic chemical is an aliphatic compound.

13. The composition of claim 10 wherein said organic chemical is a carbocyclic compound.

14. The composition of claim 12 wherein said carbocyclic compound is an aromatic compound.

15. The composition of claim 13 wherein said carbocyclic compound is an alicyclic compound.

16. The composition of claim 9 wherein an excess of sulfur to said carbonaceous chemical, by weight, is supplied into said reactor.

17. A chemically inert, solid composition of matter composed substantially of sulfur and carbon produced by the process comprising the following steps:

a) Reacting sulfur vapor and a solid or liquid carbonaceous chemical together in a reactor under a substantially oxygen-free atmosphere at a temperature above the vaporization temperature of sulfur in the range of 500 degrees C. to 1500 degrees C., so as to form a chemically inert, solid composition of matter composed substantially of sulfur and carbon, which resulting solid composition has little or no remaining residues of said solid or liquid carbonaceous chemical, and b) Separating the resulting formed solid composition from any vapor phases in the reactor.

18. The composition of claim 17 wherein said carbonaceous chemical is an organic chemical.

19. The composition of claim 18 wherein said organic chemical is a hydrocarbon compound.

20. The composition of claim 18 wherein said organic chemical is an aliphatic compound.

21. The composition of claim 18 wherein said organic chemical is a carbocyclic compound.

22. The composition of claim 21 wherein said carbocyclic compound is an aromatic compound.

23. The composition of claim 21 wherein said carbocyclic compound is an alicyclic compound.

24. The composition of claim 17 wherein an excess of sulfur to said carbonaceous chemical, by weight, is supplied into said reactor.

25. A chemically inert, solid composition of matter composed substantially of sulfur and carbon produced by the process comprising the following steps:

a) Reacting sulfur vapor and a nonhalogenated carbonaceous chemical together in a reactor under a substantially nitrogen atmosphere at a temperature of approximately 500 degrees C. and at a pressure of approximately one to two atmospheres, so as to form a chemically inert, solid composition of matter composed substantially of sulfur and carbon, which resulting solid composition has little or no remaining residues of said nonhalogenated carbonaceous chemical, and b) Separating the resulting formed solid composition form any vapor phases in the reactor.

26. The composition of claim 25 wherein an excess of sulfur to said carbonaceous chemical, by weight, is supplied into said reactor.

27. The composition of claim 1 wherein said composition is insoluble in organic solvents.

28. The composition of claim 27 wherein said composition is insoluble in inorganic acids and bases.

29. The composition of claim 28 wherein said composition is insoluble in aqua regia and carbon disulfide.

30. The composition of claim 9 wherein said composition is insoluble in organic solvents.

31. THe composition of claim 30 wherein said composition is insoluble in inorganic acids ad bases.

32. The composition of claim 31 wherein said composition is insoluble in aqua regia and carbon disulfide.

33. The composition of claim 17 wherein said composition is insoluble in organic solvents.

34. The composition of claim 33 wherein said composition is insoluble in inorganic acids and bases.

35. The composition of claim 34 wherein said composition is insoluble in aqua regia and carbon disulfide.

36. The composition of claim 25 wherein said composition is insoluble in organic solvents, inorganic acids and bases, and aqua regia.

* * * * *